Feb. 7, 1950 — R. R. RANEY — 2,496,493
HAY GATHERER AND CHOPPER
Filed Dec. 5, 1946 — 2 Sheets-Sheet 2
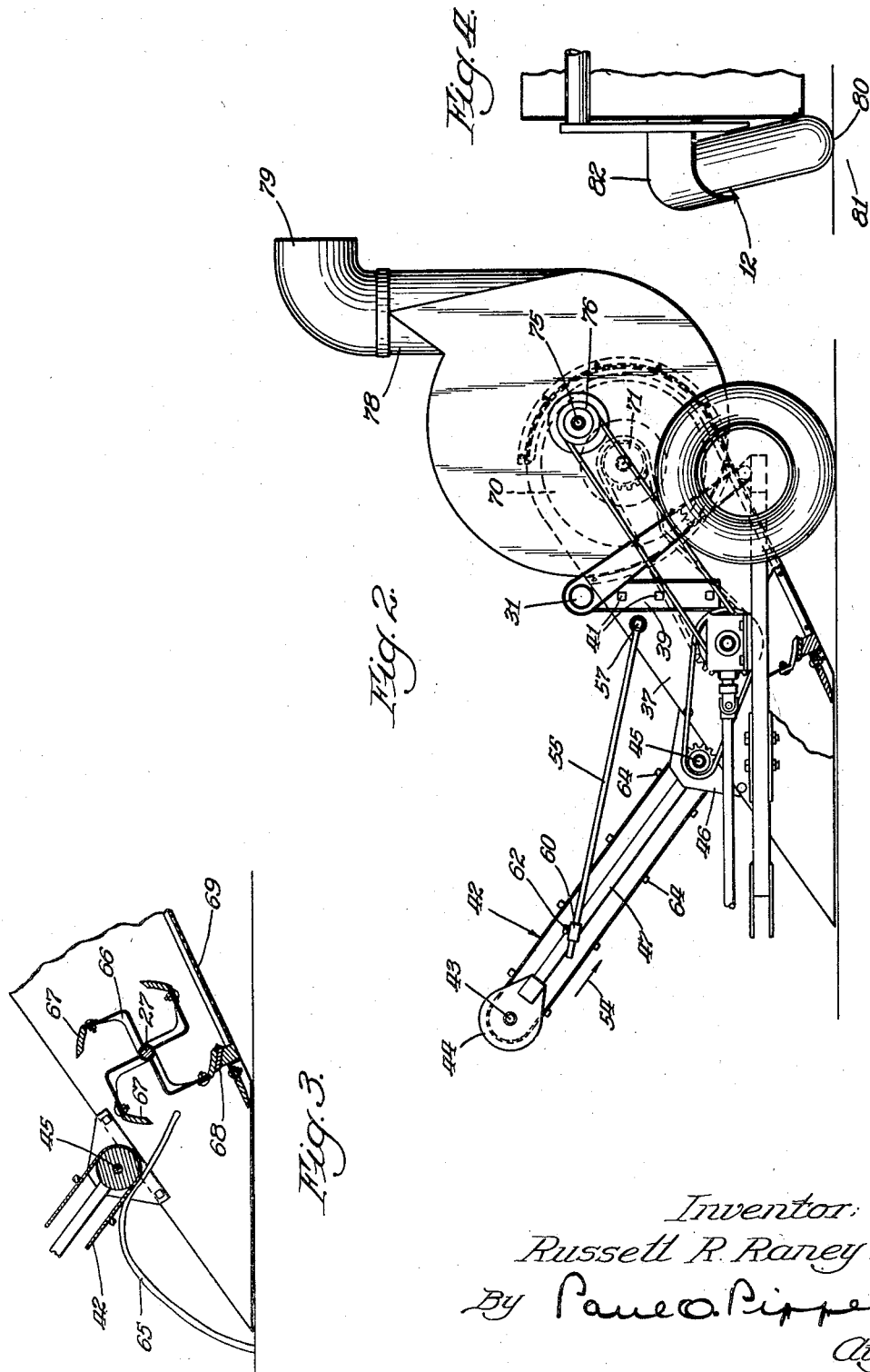
Inventor:
Russell R. Raney
By Paul O. Pippel
Atty.

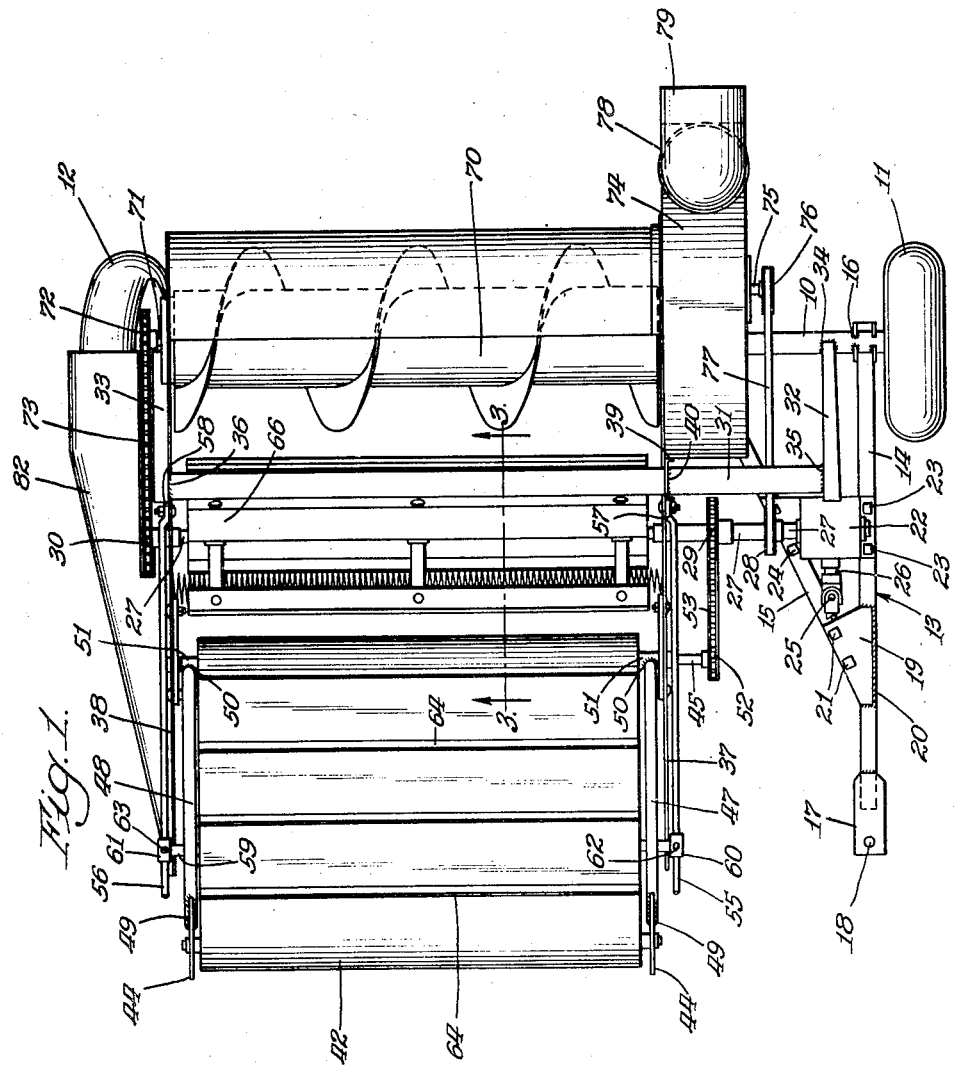

Patented Feb. 7, 1950

2,496,493

UNITED STATES PATENT OFFICE 2,496,493

HAY GATHERER AND CHOPPER

Russell R. Raney, La Grange, Ill., assignor to International Harvester Company, a corporation of New Jersey Application December 5, 1946, Serial No. 714,195

2 Claims. (Cl. 56—156)

1

This invention relates to a new and improved field hay chopper and has for one of its principal objects the provision of means for chopping standing forage crops and grain and then conveying them to a wagon or other trailing vehicle or receptacle.

An important object of the present invention is to provide a means for feeding standing hay or other grain into a chopping mechanism which will cut the hay in small increments while the stalk is still held in the ground by its roots.

Another important object of this invention is to provide a hay chopper or harvesting machine which eliminates the usual reciprocating cutter bar and provides in lieu thereof a rotary chopper.

A further object of this invention is to provide a hay chopper with a plurality of conveying and elevating elements all adapted to operate on parallel shafts and rotating in the same direction, thus rendering the drive for all of the mechanism in the hay chopper simple.

Another and still further object of this invention is the provision of a hay chopper easy and economical to manufacture.

Other and further important objects of this invention will become apparent from the disclosures in the following specification and accompanying drawings, in which:

Figure 1 is a top plan view of the hay chopper of this invention;

Figure 2 is a side elevational view partially in section of the hay chopper as shown in Figure 1;

Figure 3 is a sectional view taken on the line 3—3 of Figure 1; and

Figure 4 shows a front sectional detail of the side supporting wheel.

As shown in the drawings:

The reference numeral 10 indicates generally a vehicle axle having supporting wheels 11 and 12 mounted at the ends thereof and constituting a wheeled truck. A draft or hitch frame 13 is attached to the wheel truck for the purpose of pulling the vehicle. This frame 13 includes angularly diverging side members 14 and 15 which are attached preferably by welding to the axle 10. The weld attachment for the member 14 is shown at 16 in Figure 1. The remainder of the draft frame 13 consists of a forwardly extending clevis 17 adapted to be attached to a tractor draw-bar or the like by means of a pin being dropped through vertically aligned holes 18 in the clevis and draw-bar respectively. A gusset plate 19 is welded at 20 to the side member 14 and is attached to the diverging side member 15 by means of bolts 21. This plate 19 acts to maintain the side frame members 14 and 15 rigidly fixed with respect to each other.

A gear box 22 is mounted on and between the members 14 and 15 by bolts or the like 23 and 24 respectively. This gear box 22 is adapted to receive its power or drive from the power take-off shaft of a tractor (not shown). Driving linkage is extended rearwardly from the tractor power take-off to a universal joint shown at 25 which directly drives a shaft 26 extending into the gear casing 22. The interior of the gear casing preferably consists of a pair of bevelled gears, not shown, which transmit the rotary drive of the shaft 26 extending in a longitudinal direction to a transversely extending shaft 27 extending from the side of the gear box 22. This shaft 27 carries a V-belt pulley 28 and a sprocket 29 adjacent the draft frame 13 and a second sprocket 30 on the far end thereof adjacent the wheel 12. It will be shown subsequently that the drive for all of the elements of this hay chopper are taken from these three spaced driven members, the V-belt pulley 28, and the sprockets 29 and 30.

A tubular member 31, commonly known as a torque tube, is carried above and somewhat forwardly of the axle 10 by means of arms 32 and 33. These arms are rigidly attached to the axle and to the torque tube, and as best shown in Figure 1 these attachments are shown as welds 34, 35, and 36. The entire hay chopper of this invention is suspended from this elevated torque tube 31.

Side sheet members 37 and 38 are attached to the torque tube 31 through the medium of a depending channel member 39 which is welded to the torque tube 31 at 40 and depends downwardly therefrom as shown in Figure 2. Bolts 41 pass through the channel member 39 and the side sheet 37 thereby holding the two members together. The support for the side sheet 38 is similar to the support for the side 37 and no details have been shown for this duplication of structure. A conveyor 42 extends upwardly and forwardly of the hay chopper as shown in both Figures 1 and 2. The upper end of the conveyor is carried on a shaft 43 which is supported in brackets 44. The lower end of the conveyor 42 is carried about a shaft 45 which is journally supported in bracket members 46. The spacing of the shafts 43 and 45 is maintained by a pair of rigid arms 47 and 48 at each side of the conveyor by weld attachments to the brackets 44 at 49 and 50 to sleeve members 51 surrounding the shaft 45. A sprocket 52 is fastened to the inner end of the shaft 45 and lies in a plane with the driving sprocket 29 so that a chain 53 extending around and between the sprockets 29 and 52 will impart rotative drive from the shaft 27 to the shaft 45. Driving of the shaft 45 in a counter-clockwise direction as shown in Figure 2 causes driving of the conveyor 42 in the direction indicated by the arrow 54. The angular inclination of the upwardly and forwardly extending conveyor 42 is maintained and/or adjusted by means of supporting arms 55 and 56 which extend outwardly from attachment to the side sheets 37 and 38 respectively at 57 and 58. A cross supporting member 59 extends between the upper and lower flights of the conveyor 42 and is positioned beneath the rigid arms 47 and 48. Each end of the cross member 59 is provided with a sleeve at right angles thereto as shown at 60 and 61. The sleeves are adapted to telescopically receive the forwardly extending arms 55 and 56 respectively. Set screws 62 and 63 are adapted to adjustably hold the cross member 59 fixed with respect to its position on the forwardly extending supporting arms 55 and 56. It is obvious that if the cross member 59 were moved rearwardly toward the hay chopper the conveyor 42 would be inclined at a greater angle, whereas if the cross member 59 were moved forwardly away from the hay chopper the conveyor 42 would be inclined at a lesser angle.

Slats 64 are placed at intervals along the surface of the conveyor 42 so that as the conveyor is actuated the downwardly and rearwardly moving slats 64 carry and bend tops of standing grain such as hay downwardly and rearwardly so that the standing grain enters the chopping device of this machine in longitudinal extension and substantially parallel with the ground. As best shown in Figure 3, when the top of a stalk 65 of hay or other grain is discharged from the conveyor 42 it is picked up by a rotary chopping device 66 and carried downwardly and rearwardly by the several knife blades 67 into or past a cutter or shear bar 68 at which time the stalk 65 is cut off. The length of stalk which is cut depends on the forward speed at which the vehicle is progressing through the field of standing hay or grain. It is the purpose of this hay chopper to cut the hay in small pieces, and this will be accomplished by continuous feeding of the standing stalks of hay in a horizontal and rearward direction by the conveyor 42 into the rotating chopper 66. The chopper with its knife blades 67 will cut off that portion of the stalk of hay which has progressed within the path of the rotary chopper 66. The top of the stalk is the first part to be cut off and the remainder of the stalk is cut off in small pieces from the top to the bottom. As the stalk is cut it is thrown rearwardly and up the inclined floor 69 into the path of a transversely positioned auger conveyor 70. The rotary chopper 66 is carried on a shaft 27 which as previously stated is driven from the gear box 22. This rotary chopper rotates in a counter-clockwise direction as viewed in Figure 2 and thus moves similarly to the conveyor 42.

The auger conveyor 70 is mounted on a shaft 71. A sprocket 72 fastened to the shaft 71 at the far side of the machine is in a plane with the sprocket 30 mounted on the end of the shaft 27 and thus a chain 73 joining the two sprockets 30 and 72 imparts rotational drive to the auger 70. The auger is also adapted to rotate in a counter-clockwise direction as viewed in Figure 2 and therefore the direction of drive is the same as the conveyor 42 and rotary chopper 66. This counter-clockwise rotation of the auger 70 causes a movement of chopped material from the far side of the machine to the near side as viewed in Figure 1 so that this chopped hay or other grain will be carried across the machine toward and into an elevating blower 74. The blower 74 houses a fan (not shown) which is mounted on a shaft 75 carrying at its outer end a V-belt pulley 76. A V-belt 77 extends between the V-belt pulleys 28 and 76 and imparts drive from the former to the latter. The side of the blower 74 is equipped with an opening in alignment with the auger 70 to receive material from the auger. As the chopped hay is fed into the blower 74, the fan blades pick up the hay and as the fan also rotates in a counter-clockwise direction, the material is carried down and beneath the shaft 75 and up and out the discharge conduit 78 which has a swivel head 79 for the purpose of directing the discharge of chopped hay.

In operation the hay chopper is drawn through a field of standing hay, the tops of the hay plants or stalks are bent downwardly and rearwardly by the conveyor 42, and as the machine progresses forwardly the tops of the plants enter the field of travel of the rotary chopper 66 and are cut off by cooperation of the rotary chopper knives 67 and the shear blade 68. The rotation of the chopper member acts to draw the chopped hay upwardly and rearwardly into the transversely positioned auger conveyor 70 whereupon the chopped hay is fed laterally into the blower 74 and up and out a discharge nozzle 79 which may be directed to a trailing wagon or any other receptacle means. In order that the far side of the machine does not break down standing grain, the outer wheel 12 as best shown in Figure 4 is inclined or toed in. The contact of the wheel 12 with the ground shown at 80 is within the line 81 indicating the width of the hay chopper. A shield 82 as best shown in Figure 1 extends from a point adjacent the forward end of the side sheet 38, flares outwardly, and covers the upper portion of the wheel 12 so that the standing hay or grain is guided outside of the wheel 12. The remaining hay is thus saved for chopping on the next round of the machine.

The hay chopper of this invention is substantially entirely suspended from the torque tube 31 and the remaining elements indirectly hang from this tube by attachment to the side sheets 37 and 38 which are carried by the torque tube 31. The entire machine is of novel construction and is conducive to easy manufacture. The hay chopper eliminates numerous parts and elements which have been considered necessary and essential for a number of years, and the device is therefore quite economical. The drive for the plurality of elements is relatively simple because all elements rotate in the same direction.

Numerous details of construction may be varied throughout a wide range without departing from the principles described herein, and I therefore do not propose limiting the patent granted hereon otherwise than as necessitated by the appended claims.

What is claimed is:

1. In a field crop chopper comprising a transverse wheel supported axle and a supporting structure carried thereby including a forwardly and downwardly inclined crop gathering means including a floor having its leading edge adapted to closely ride over the ground, a transverse shear bar mounted at said leading edge, a rotary cutter disposed on a transverse axis immediately over the shear bar and having cutting elements co-operating with the shear bar to chop crop material fed across said bar, an upwardly and forwardly inclined conveyer means carried on the supporting structue for engaging standing crops to bend same downwardly and rearwardly toward and deliver same to the shear bar and cutter, and the discharge end of said crop bending conveyer means being positioned in close proximity to the path of rotation of the cutting elements to insure direct transfer of crop material to the cutting elements.

2. In a field crop chopper comprising a transverse wheel supported axle and a supporting structure carried thereby including a forwardly and downwardly inclined crop gathering means including a floor having its leading edge adapted to closely ride over the ground, a transverse shear bar mounted at said leading edge, a rotary cutter disposed on a transverse axis immediately over the shear bar and having cutting elements co-operating with the shear bar to chop crop material fed across said bar, an upwardly and forwardly inclined conveyer means carried on the supporting structure for engaging standing crops to bend same downwardly and rearwardly toward and deliver same to the shear bar and cutter, the discharge end of said crop bending conveyer means being positioned in close proximity to the path of rotation of the cutting elements to insure direct transfer of crop material to the cutting elements, a transverse rotary auger disposed on the supporting structure closely behind the rotary cutter to receive chopped crops therefrom and convey same transversely to a side edge of the crop supporting structure, a chopped crop discharge elevator carried on the supporting structure adjacent said side edge, and a draw frame connected with the axle structure alongside the supporting structure and disposed at the same side thereof with the elevator.

RUSSELL R. RANEY.

REFERENCES CITED

The following references are of record in the file of this patent:

UNITED STATES PATENTS

| Number | Name | Date |
| --- | --- | --- |
| 1,060,283 | Phillips | Apr. 29, 1913 |
| 1,630,603 | Boxrud | May 31, 1927 |
| 1,977,312 | Knapp | Oct. 16, 1934 |
| 2,008,470 | Rall et al. | July 16, 1935 |
| 2,253,633 | Lindly | Aug. 26, 1941 |
| 2,269,828 | Michel et al. | Jan. 13, 1942 |